Patented Dec. 17, 1935                                                                                              2,024,210

UNITED STATES PATENT OFFICE 2,024,210

HIGH VOLTAGE ELECTROLYTIC COUPLE

Philip E. Edelman, Chicago, Ill., assignor to
Robert T. Mack, Chicago, Ill., trustee No Drawing. Application October 9, 1930,
Serial No. 487,499

4 Claims. (Cl. 175—315)

An object of this invention is to provide an electrolytic couple capable of service as a condenser, a rectifier, a protective regulating device, or a lightning arrestor device, suitable for high voltage operation.

Another object is to provide an improved electrolyte for such apparatus, suitable for high voltage film forming service.

These and other objects, as will presently appear, are accomplished by this invention which is fully described in the following application.

A polarized electrolytic couple comprises two electrodes exposed to or immersed in an electrolytic film forming material, at least one of the electrodes consisting of a filming metal, such as aluminum, tantalum, magnesium or beryllium. The co-operating electrode may be composed of duriron, or other suitable metal. For a condenser both electrodes may be composed of high grade commercial aluminum containing less than one-half percent of impurities, such as iron and silicon, and preferably containing a slight trace of copper alloyed therein.

A difficulty in preparing and using such couples has heretofore been found in the critical voltage limitation thereof. By "critical voltage" is meant that voltage at which sparks appear accompanied by much gassing and excessive heating. It is the factor that limits the maximum voltage for operation per cell. This invention is chiefly concerned with extending the critical voltage to much higher values so that a single cell or section can operate at voltages which formerly required series combinations of a plurality of cells for the same result.

I have discovered or invented a suitable electrolyte material for the purpose. This material is an electrolyte of the benzoic acid class. In this class are included derived compounds of benzoic acid and of salicylic acid having like general and similar experimental properties equivalent to benzoic acid of commerce, of which class and group the following compounds are examples.

*Electrolyte materials of the benzoic acid class*

In the class with benzoic acid are any suitable derived soluble compounds of benzoic acid or salicylic acid, such as—

| Compound | Probable formula | Molecular weight |
|---|---|---|
| Benzoic acid | $C_6H_5.COOH$ | 122.05 |
| Ammonium salicylate | $NH_4C_7H_5O_3$ | 155.08 |
| Hydroxy benzoic acid, ortho, (salicylic acid) | $HO.C_6H_4.COOH$ | 138.05 |
| Hydroxy benzoic acid, meta | $HO.C_6H_4.COOH$ | 138.05 |
| Hydroxy benzoic acid, para | $HO.C_6H_4.COOH$ | 138.05 |
| Benzoyl benzoic acid, ortho | $C_6H_5.CO.C_6H_4COOH+H_2O$ | 244.10 |
| Benzoyl benzoic acid, meta | $C_6H_5.CO.C_6H_4COOH$ | 226.08 |
| Benzoyl benzoic acid, para | $C_6H_5.CO.C_6H_4COOH$ | 226.08 |
| Benzilic acid | $(C_6H_5)_2C(OH).COOH$ | 228.10 |
| Benzoin | $C_6H_5.CH(OH).CO.C_6H_5$ | 212.10 |
| Benzoyl aminobenzoic acid, meta | $NH.(C_7H_5O).C_6H_4.COOH$ | 241.10 |
| Benzoyl aminobenzoic acid, para | $NH.(C_7H_5O).C_6H_4.COOH$ | 241.10 |
| Benzyl benzoic acid, ortho | $C_6H_5.CH_2.C_6H_4.COOH$ | 212.10 |
| Benzyl benzoic acid, para | $C_6H_5.CH_2.C_6H_4.COOH$ | 212.10 |
| Dimethyl benzoic acid, (2,6) | $(CH_3)_2C_6H_3.COOH$ | 150.08 |
| Dimethyl benzoic acid, (2,4) | $(CH_3)_2C_6H_3.COOH$ | 150.08 |
| Dinitro benzoic acid (2,6) | $(NO_2)_2.C_6H_3.COOH$ | 212.05 |
| Dinitro benzoic acid (2,4) | $(NO_2)_2.C_6H_3.COOH$ | 212.05 |
| Nitro benzoic acid, ortho | $NO_2.C_6H_4.COOH$ | 167.05 |
| Nitro benzoic acid, meta | $NO_2.C_6H_4.COOH$ | 167.05 |
| Ethyl benzoic acid, para | $C_2H_5.C_6H_4.COOH$ | 150.08 |
| Trimethyl benzoic acid | $(CH_3)_3.C_6H_2.COOH(1)$ | 164.10 |
| Isopropyl benzoic acid, ortho | $(CH_3)_2.CH.C_6H_4.COOH$ | 164.10 |
| Propyl benzoic acid, para | $C_3H_7.C_6H_4.COOH$ | 164.10 |
| Phenyl benzoic acid, ortho | $C_6H_5.C_6H_4.COOH$ | 198.08 |
| Phenyl benzoic acid, meta | $C_6H_5.C_6H_4.COOH$ | 198.08 |
| Calcium salicylate | $Ca(C_7H_5O_3)_2.2H_2O$ | 350.08 |
| Lithium salicylate | $Li(C_7H_5O_3)$ | 143.98 |
| Sodium salicylate | $Na C_7H_5O_3$ | 160.04 |
| Strontium salicylate | $Sr(C_7H_5O_3)_2.2H_2O$ | 397.74 |
| Phenyl salicylate | $HO.C_6H_4.COO.C_6H_5$ | 214.08 |
| Salicylic acetate | $C_2H_3O_2.C_6H_4.COOH$ | 180.06 |
| Salicylic aldehyde | $HO.C_6H_4.CHO$ | 122.05 |
| Salicylic anilide | $HO.C_6H_4.CO.NHC_6H_5$ | 213.10 |
| Sodium benzoate | $Na C_7H_5O_2$ | 144.04 |
| Potassium benzoate | $K C_7H_5O_2.3H_2O$ | 214.18 |
| Ammonium benzoate | $NH_4 C_7H_5O_2$ | 139.06 |
| Magnesium benzoate | $Mg(C_7H_5O_2)_2.3H_2O$ | 320.45 |
| Lithium benzoate | $Li C_7H_5O_2$ | 127.98 |
| Methyl benzoate | $C_6H_5.COO.CH_3$ | 136.06 |
| Phenyl benzoate | $C_6H_5.COO.C_6H_5$ | 198.08 |

Of the above examples benzoic acid is found most suitable, ammonium salicylate next best, and ammonium benzoate third best for practical use, either singly or in combination with other electrolyte materials, and either prepared in a dilute solution with distilled water heated until the solution is complete or in hot glycerine, or other organic solvent material suitable for the purpose.

The generic electrolyte for the stated purpose is defined as a compound of the stated benzoic acid class. A first species of this invention is the derived compound comprising salicylic acid or a soluble salicylate, such as ammonium salicylate. A second species of this invention is the combined electrolytic solution of a benzoic acid material with a salicylate. A third species of the invention is the use of a compound of the stated benzoic class combined with some other suitable electrolyte material or compound such, for example, as a dilute solution of ammonium molybdate and ammonium bitartrate containing a trace of combined iron or other suitable heavy metal, such as copper or tin.

The function of the content of the stated benzoic acid class in the latter case is to greatly extend the critical voltage of the electrolyte solution to which same is added.

There are two methods for using the polarizing electrolyte containing the benzoic acid class of compound. One is to first plate the anode or electrode material in any suitable known electrolyte in a customary manner as a preparatory treatment. Thus, a dilute solution of ammonium bitartrate and ammonium molybdate, or similar compounds, as set forth in my Patent No. 1,773,665, granted April 19, 1930, can be used to coat the aluminum anode in the usual manner, up to a critical voltage of predetermined value, such as 475 volts, after which the filmed anode can be replated or recoated to a higher critical voltage in an electrolyte of the benzoic acid class, such as benzoic acid dissolved in a dilute solution of distilled water, or any of the stated equivalents or combinations thereof. A reinforcing high voltage film is thus replated over the initial film.

The other method of forming the film is to use only the benzoic acid type of electrolyte alone or combined with the electrolyte mixture containing ammonium molybdate and ammonium bitartrate all in a single treating solution. For this purpose, duriron may be employed as the cathode while a dilute solution is used in sufficient volume to maintain the operating temperature below 90° centigrade for the anodes being treated. The plating or coating may be carried out in customary manner by supplying a source of direct current at a controlled voltage to the anode and cathode in the electrolyte containing the benzoic acid class of compound. The initial voltage at the start may be as high as 600 volts. It is preferred to start at about 500 volts for plating and continue the treatment by increments up to 650 volts, or as much higher as may be desired, the upper limit being predetermined according to the dilution of the electrolyte material. A film coating at 1000 volts may be had on the anode in this manner. The coated anode can be assembled in any well known manner in either an aqueous or non-aqueous electrolyte for service as an electrolytic condenser, or a rectifier or a voltage regulating cell. As an example, a strip of aluminum .006 inch thick, three inches wide and nineteen inches long can be so plated to 600 volts as anode and dried, after which said anode can be wound with an untreated aluminum sheet and a gummed spacer containing gum arabic dispersed in hot glycerine in the proportion of four parts of glycerine to one part by weight of gum arabic. This affords a condenser having six microfarads capacity and negligible leakage current when operated at 500 volts. It is pointed out that the operating electrolyte need not be the same as the plating electrolyte, but, if desired, the operating electrolyte of the benzoic acid class content may also be diluted for use as an operating electrolyte for a polarized electrolytic couple.

For alternating current service the couple may comprise two of said coated anodes immersed in an operating electrolyte of either a dilute solution of benzoic acid, or a dilute solution of gum arabic, or a dilute solution of ammonium molybdate. The volume of solution used and its container must provide for sufficient heat dissipation when the couple is used on 60 cycle alternating current at either 110 volts, 220 volts, or 440 volts. The capacity of the double anode cell will be one-half that of a single anode used against a non-polarized electrode. For higher voltages, series combinations of plural cells may be used on alternating current service in series-aiding or series-opposing relation as is customary in this art. Owing to the higher formation voltage of the anode film treated in the electrolyte of the benzoic acid class, operation is made practical on higher voltages per cell than was heretofore possible. Such a double anode cell is suitable for use in sizes of 5 to 20 microfarads for starting duty of condenser type induction motors for fan, refrigerator, or elevator service. By proper provision for dissipation of heating, such double anode cells can be employed continuously on alternating current service operated at less than one-half of the formation voltage used to plate the film on the anode in the benzoic acid class electrolyte.

Examples of suitable proportions found for electrolyte mixtures according to the invention follow, together with examples of test readings on completed samples of condensers manufactured therefrom.

*Ammonium salicylate solution*

This electrolyte material may be prepared in distilled water, a suitable proportion by weight being one part of ammonium salicylate to one thousand parts of water. It is also soluble in hot glycerine and remains in solution upon cooling.

When an aluminum electrode is plated in such a solution, a distinctive greenish coating becomes visible on the anode at about 450 volts after one-half hour of plating time. Thin white crystals tend to form at the air line on the anode at the position where the atmosphere meets the plating solution. The starting voltage for plating may appropriately be 340 volts. At 460 volts the anode coating tends to become more greyish in coloring than at 450 volts. A current density of 30 milliamperes per square inch was used for forming the film. The voltage was raised to 510 volts and later to 550 volts. From 550 volts up, the anode coating became distinctly greyish in appearance. No foam formed in the electrolyte up to 605 volts. Sparks appeared at 600 to 605 volts, corresponding to the critical voltage for this dilution. Typical readings of voltage applied and current through the cell are—

| Volts | Current, milliamperes |
|---|---|
| 200 | 0.3 |
| 300 | 0.8 |
| 400 | 1.5 |
| 500 | 2.4 |
| 600 | 15.0 |

On a run of plates in ammonium salicylate solution, the plating time required for formation of the anode film to 600 volts was two hours and twenty minutes. Starting at 300 volts, the plating progressed up to 530 volts by the end of the first hour and reached 600 volts by the end of the second hour. The critical voltage of the dilution used was 640 volts. No sparks occurred in the solution up to 610 volts. A completed condenser made from such a prepared anode, tested as follows:

| Volts applied | Leakage current per mfd. |
|---|---|
|  | Milli-amperes |
| 300 | 0.003 |
| 400 | 0.012 |
| 500 | 0.33 |
| 550 | 0.72 |
| 600 | 1.8 |

*Benzoic acid and ammonium salicylate solution*

A further example of a species of the invention is afforded by a single electrolyte solution containing both ammonium salicylate and benzoic acid. In one thousand parts of water, one part each of the said two compounds is dissolved. A 6 mfd. anode plate previously plated to 460 volts in a solution of ammonium bitartrate and ammonium molybdate was replated in this solution up to 605 volts with a good uniform film coat. The replated anode was assembled in a condenser with gummed gauze spacer and an untreated cathode of aluminum. It then tested as follows:

| Capacity 4½ mfds. | Volts | Milli-amperes leakage for 4½ mfds. |
|---|---|---|
|  | 400 | 0.35 |
|  | 500 | 1.1 |

The electrolyte containing both benzoic acid and ammonium salicylate is suitable for use up to 640 volts, and is especially suitable for replating anodes previously prepared at lower critical voltage, such as 450 volts. A condenser made with such a replated anode is suitable for operation at 100 volts more than it will withstand when not so replated.

The addition of ammonia water to the last named solution was tried, using sufficient ammonia to render the solution just neutral. An aluminium electrode was plated in this solution up to a voltage of 720 volts in one hour's time. The use of ammonia water, as aforesaid, tends to avoid foamy results in the electrolyte, i. e., foam does not form as rapidly at the surface of the treating liquid during the plating operation. There is no difficulty in plating anodes up to 640 volts film formation in the solution containing benzoic acid, ammonium salicylate and excess ammonia water to bring the solution to neutral. The film prepared in a solution of ammonium salicylate is durable and lasts, even when exposed for a considerable time to the atmosphere. A suitable operating electrolyte for a condenser with an anode prepared as stated is afforded by the customary gummed gauze used in condensers of this class.

*Benzoic acid solution*

For a benzoic acid solution, as a further specific example, one part of chemically pure benzoic acid may be dissolved in eight hundred parts of hot distilled water. The fumes during preparation should not be breathed by an operator as they are irritating to membranes. Benzoic acid is safely handled in the weak dilutions employed. When a solution of benzoic acid alone is used with duriron cathode, a brownish scum or froth tends to form in service, without detriment to the plating, and the solution becomes tan color after considerable plating service.

A suitable solution can be prepared by dissolving ¼ ounce of benzoic acid in 500 c. c. of hot distilled water and adding this strong solution to six gallons of cold distilled water in the plating tank. There is no sparking up to 610 volts in such a solution, and plating may be completed in a period of one hour up to five hours according to the current density employed. The coated plates are very uniformly filmed and have a durable and lasting texture in the coat. Aside from the presence of more foam in the solution during use, a better anode plate is obtained in a pure solution of benzoic acid than when ammonia water is added to form ammonium benzoate in the solution. The anode so prepared is more durable and permits less leakage than when ammonia is added. Ammonia addition, however, tends to reduce or prevent formation of froth on the solution used. Usually a few drops of ammonia water added to five gallons of dilute benzoic acid solution is sufficient to stop undesired foaming action during the plating operation. Either raw aluminum stock or replate anode stock can be successfully coated in such a solution up to 600 volts, or higher filming voltage. It is necessary to use a large volume of plating liquid to maintain the temperature below boiling point, or to employ tank cooling means for this purpose. The temperature should not exceed 90° centigrade during plating up to 640 volts, but may reach 94° at 645 volts. Typical test results on condensers made from anodes plated to 640 volts in a solution of pure benzoic acid for a period of two hours follow.

| Volts | Milli-amperes leakage per mfd. |
|---|---|
| 200 | 0.00 |
| 300 | 0.03 |
| 400 | 0.11 |
| 500 | 0.32 |
| 550 | 0.71 |
| 575 | 0.95 |

By plating the anode to 700 volts, the assembled condenser tested as follows:

| Volts | Milli-amperes leakage per mfd. |
|---|---|
| 300 | 0.01 |
| 400 | 0.05 |
| 500 | 0.33 |
| 600 | 0.94 |

The anode coating has a yellowish-tan coloring when the plating voltage is terminated between 600 and 700 volts. On some specimens spots tend to form on the anode, but without detriment to the result. There is no breakdown up to 740 volts, and probably this solution in suitable dilution can be worked to over 1000 volts and remain below the critical or sparking voltage.

A desirable characteristic of anodes coated in a benzoic acid class electrolyte, either as raw stock or replate stock, is that they do not lose their film on standing. Substantially no reforming period is required in the completed condenser after long standing, thereby avoiding surge current drains experienced with condensers having films prepared in borate solutions, or the like. It is not necessary to have more than ¼ ounce of benzoic acid content in five gallons of solution for satisfactory plating.

Addition of benzoic acid solution to other electrolyte material

An example of a practical addition of the benzoic acid class solution to a solution having lower critical voltage in order to raise the critical voltage follows:

An electrolyte solution prepared in distilled water containing, besides traces of iron and tin, one ounce of ammonium molybdate and one and one-half ounces of ammonium bitartrate per six gallons of water has a critical voltage of 460 volts. If to this solution there is added, in the proportion of one part solution aforesaid to one part of benzoic acid solution containing one-fourth ounce of benzoic acid, or its equivalent per five gallons of water, the resulting mixture has a critical voltage raised to 610 volts instead of 460 volts. Anodes plated to 600 volts in such a single solution or mixture afford very satisfactory plates, with plating time from one hour to three hours according to the current density employed. A current density of 30 milliamperes of anode surface is suitable for rapid satisfactory coating. Comparative results for different anode plating times for completed condensers follow.

| Anode voltage for plating | Time of plating | Merit rating |
|---|---|---|
| | (In above last named solution) | |
| 540 volts | 3 hours | 3d. |
| 600 volts | 1 hour | 2d. |
| 600 volts | 3 hours | 1st. |

The advantage of higher anode plating voltages permitted by this invention without detrimental sparking is evident, as a one hour plate prepared at 600 volts is superior in performance to a three hour plate prepared at 540 volts. As between the two 600 volt anode specimens, both had the same peak operating voltage in finished condensers, of 590 volts, but the three hour plate had less leakage, and is accordingly first in merit of these samples. The peak operating voltage for the anode prepared at 540 volts was only 500 volts.

The last named solution containing besides ammonium bitartrate and ammonium molybdate with traces of iron and tin, the aforesaid benzoic acid content is regarded as a practical example of a plating solution suitable for anodes plated to 600 volts for use in condensers conservatively rated for 500 volt continuous service when assembled in gummed gauze type condensers. The plating solution tends to become a tan color during prolonged use without detriment and does not foam in undesired amount during service. It can be used for a large number of plates for a long period of time by maintenance with diluted plating solution to make up for evaporation and plating losses during service. It gives uniformly good coated anodes of distinctive merit and durability, and can be worked with commercial aluminum raw stock containing a trace of copper and less than one-half percent total impurities, including iron and silicon.

A more rapid film formation up to 600 volts can be had with salicylate of ammonia solution than with a solution of benzoic acid. The latter requires about fifty (50%) percent more forming time, but reaches to a higher critical voltage of 750 volts, or more.

If any of the equivalent materials of the benzoic acid class are employed, they are to be used in equivalent proportions referred to the corresponding benzoic acid content stated to be suitable according to experimental tests. Considerable variation is permissible, especially in the direction of dilution, and various changes and modifications may be made by persons skilled in this art within the spirit of the invention and within the scope of the appended claims.

I claim:

1. An electrolyte for preparing a film on a filming metal comprising a solution containing ammonium benzoate as the film-forming chemical therefor.

2. A filming electrolyte solution containing ammonium bitartrate, ammonium molybdate, a trace of a heavy metal of the empirical class having the characteristics of iron or tin, and benzoic acid.

3. The combination with a film forming metal, such as aluminum, of a polarizing electrolyte comprising benzoic acid as the film-forming chemical therefor.

4. An electrolyte for preparing a film on a filming metal such as aluminum comprising a solution containing benzoic acid and ammonia, said benzoic acid being in sufficient amount to serve as the film forming chemical of said solution.

PHILIP E. EDELMAN.